US00RE45809E

(19) United States
(12) Reissued Patent
Hatter et al.

(10) Patent Number: US RE45,809 E
(45) Date of Reissued Patent: Nov. 24, 2015

(54) INNER WIPES

(71) Applicants: Donald Hatter, Lincroft, NJ (US); Lawrence Lambelet, Flemington, NJ (US)

(72) Inventors: Donald Hatter, Lincroft, NJ (US); Lawrence Lambelet, Flemington, NJ (US)

(21) Appl. No.: 14/145,611

(22) Filed: Dec. 31, 2013

Related U.S. Patent Documents

Reissue of:
(64) Patent No.: 8,444,007
Issued: May 21, 2013
Appl. No.: 12/784,801
Filed: May 21, 2010

(51) Int. Cl.
*A47K 10/24* (2006.01)
*B65H 1/00* (2006.01)
*A47K 10/32* (2006.01)
*B65H 75/10* (2006.01)

(52) U.S. Cl.
CPC ..... *A47K 10/32* (2013.01); *B65H 75/10* (2013.01); *A47K 2010/3266* (2013.01); *B65H 2701/52* (2013.01)

(58) Field of Classification Search
CPC ..... A47K 10/32; A47K 2010/3266; A47K 2010/326; B65H 75/10; B65H 75/02; B65H 2701/52; B65H 2701/533
USPC ..... 221/42, 45, 46, 312 A, 34
See application file for complete search history.

(56) References Cited

U.S. PATENT DOCUMENTS 1,772,917 A * 8/1930 Sifferman ..... 242/598.1
2,555,205 A 5/1951 Steffens
3,335,973 A * 8/1967 Genn ..... 242/560.3
3,837,595 A * 9/1974 Boone ..... 242/594.5
3,848,822 A * 11/1974 Boone ..... 242/590
4,004,687 A * 1/1977 Boone ..... 206/233
4,834,316 A * 5/1989 DeLorean ..... 242/594.5
4,901,889 A * 2/1990 Mitchell ..... 222/153.11
5,509,593 A 4/1996 Bloch
5,697,577 A * 12/1997 Ogden ..... 242/598.6
5,765,717 A * 6/1998 Gottselig ..... 221/45
5,897,074 A * 4/1999 Marino ..... 242/594.1
5,950,960 A 9/1999 Marino
5,971,138 A * 10/1999 Soughan ..... 206/210
6,056,235 A * 5/2000 Brozinsky ..... 242/598.6
6,503,326 B1 * 1/2003 Mikelionis ..... 118/419
6,899,250 B2 5/2005 FitzSimons
7,311,221 B2 12/2007 Serfaty
7,354,598 B2 4/2008 Masting
7,395,986 B1 * 7/2008 Haering ..... 242/599.3
7,775,350 B2 * 8/2010 Palamountain ..... 206/226
8,444,007 B2 * 5/2013 Hatter et al. ..... 221/45

(Continued)

FOREIGN PATENT DOCUMENTS

DE 3938352 A1 7/1990
EP 1875839 A1 1/2008

(Continued)

*Primary Examiner* — Patricia Engle
(74) *Attorney, Agent, or Firm* — Lawrence Lambelet

(57) ABSTRACT

The present invention provides a dispenser for moisturized sheets in the core of a toilet paper roll. Not only are wet and dry wipes provided coincidentally, the location is particularly handy for toilet use. In a utilization of existing bathroom fixtures, the novel concept offsets the rotational axis of the toilet paper roll to make an aperture available to dispense the moisturized sheets from the volume of the core previously occupied by the conventional spool. The invention further provides a hermetically sealed refill unit and a method of dispensing and refilling.

9 Claims, 7 Drawing Sheets

(56) References Cited

U.S. PATENT DOCUMENTS

| | | | | |
|---|---|---|---|---|
| 2005/0109871 | A1* | 5/2005 | Mitchell et al. | 242/590 |
| 2005/0247720 | A1 | 11/2005 | FitzSimons | |
| 2010/0025419 | A1* | 2/2010 | Yaros | 221/34 |
| 2012/0118909 | A1* | 5/2012 | Yaros | 221/46 |
| 2015/0069172 | A1* | 3/2015 | Bricker | 242/594.5 |

FOREIGN PATENT DOCUMENTS

| | | | |
|---|---|---|---|
| GB | 2394219 | A | 4/2004 |
| WO | 2005005285 | A1 | 1/2005 |

* cited by examiner

INNER WIPES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates to cleaning wipes, and more particularly to hygienic tissues for bathroom use.

BACKGROUND OF THE INVENTION

Towelettes, or wipes, find multiple uses in a bathroom or lavatory. In addition to housekeeping use, they can be used to cleanse or dry skin. Dry wipes are sometimes inadequate, however, when sensitive or stubbornly soiled skin is involved. Wet wipes are needed for this purpose but are rarely in a handy location, particularly when a need arises at the toilet. Wet wipes require container storage to protect against evaporative losses. The containers are generally placed on a surface remote from the handy wall location of the toilet tissue roll and may not be within reach for a person at need at the toilet.

The prior art has attempted to address this inconvenience. In U.S. Pat. No. 6,503,326 to Mikelionis, two rolls are placed side-by-side on the typical toilet roll spool. One of the rolls is dry and the other, pre-moistened. Each roll is one-half the width of a standard toilet tissue roll. The half-size is achieved by folding the tissues lengthwise, such that each dispensed tissue is one folded-over sheet. The moist tissues are housed in a cylindrically-configured container and are dispensed through a horizontal slot therein. Such an arrangement has several disadvantages. In the first place, it is unlikely that consumption of both wet and dry will be matched, so managing inventories of customized products may be expensive and troublesome. Secondly, dispensing from one side may involve unintended movement of the other side. The dry side is unwound by spinning the roll on the same spool supporting the wet side. This might cause a synchronous drift of the container and result in rotating the slot out of reach. Finally, and more importantly, the consumer is forced to pay extra for a specialty product in place of the ubiquitous, and relatively less expensive, commodity toilet tissue roll.

Synchronous movement is not a problem in U.S. Pat. No. 5,950,960 to Marino. Marino places dry and wet rolls in two separate but connected containers hung above and below a toilet roll spool mounted in a conventional wall bracket. Both containers are loaded through hinged covers, and the dispensing from one can be independent from the other. The structure is rather bulky, however, and would cramp tight spaces. Space encroachment would prove to be a nuisance, particularly when the need for the wet version is infrequent. Additionally, it involves equipment purchase and installation.

U.S. Pat. No. 7,354,598 to Masting resolves the space problem by storing pre-moistened towelettes in the core of a paper towel roll. Masting converts a vertical stand for the roll to a container with a towelette dispensing aperture at the top. While it known to dispense wet wipes from the otherwise available space inside the core of a roll of dry goods, what is not known is how to accomplish this from a hanging toilet tissue roll. A toilet roll is conventionally suspended from a spool connected to the horizontal arms of a wall bracket. The spool partially fills the core space leaving little room for alternative use of that space. The present invention presents a novel solution for accommodating the spool while providing access to the total volume of the core.

SUMMARY OF THE INVENTION

It is accordingly an object of the present invention to provide a convenient way to dispense wet wipes in a bathroom. It is a further object to make wet wipes available to a person seated on a toilet. It is a further object to combine the dispensing of wet wipes with that of ordinary dry toilet tissue. It is a further object to accomplish this in a way that does not involve a requirement to purchase specialty toilet tissue rolls. It is a further object to utilize existing installations of toilet roll brackets without requiring modification or new equipment. It is a further object to fully utilize the space in the core of a common toilet tissue roll for the purpose of dispensing the wet wipes. It is a further object to maintain a moisture barrier to prevent evaporative losses from the wet wipes, or dampening of the dry wipes, during active use of the invention. It is a further object to maximize the capacity inside the core of a mounted toilet tissue roll by eliminating the existing toilet roll spool. It is further object to provide a convenient refill put-up to replenish the wet wipes. It is a further object to provide a simplified changeover method for replenishment.

These objects, and others to become hereinafter apparent, are embodied in a toilet roll dispenser for moisturized sheets comprising a cylindrical dispenser, having a rotational axis, configured to fit within the core of a toilet roll. Further, the toilet roll dispenser comprises a plurality of moisturized sheets contained within the cylindrical dispenser, said moisturized sheets connected to dispense sequentially from, at least, one end of the core. Finally, the toilet roll dispenser comprises a means for connecting the cylindrical dispenser to a wall bracket having two arms with recesses to receive a conventional toilet roll spool. With the aforementioned, a roll of toilet paper rotatably mounted on the cylindrical dispenser and suspended within the wall bracket by the means for connecting can unwind conventionally about the rotational axis, while the moisturized sheets can dispense from the interior of the core.

In a preferred embodiment, the means for connecting comprises end caps placed at each end of the cylindrical dispenser. The end caps have bosses configured to fit the recesses and a means for articulating the bosses to removably and securely mount the cylindrical dispenser between the two arms of the wall bracket. At least one of the end caps comprises a dispensing aperture centered on the rotational axis in communication with the interior of the cylindrical dispenser. The bosses lie along an axis parallel to and offset from the rotational axis.

In a particularly preferred embodiment, the end caps telescope onto the ends of the cylindrical dispenser and the means for articulating the bosses comprises a coil spring positioned between at least one of the telescoping end caps and the cylindrical dispenser. The end cap telescopes from a bypass to a seated position in a corresponding recess while the coil spring biases said end cap to the seated position. In an alternate version, the means for articulating comprises a flexible beam for each boss. The beam has the boss at a distal end and a base at a proximal end where it is positioned above an axis of rotation. The beam is rotatably fitted to the end cap such that the axis of rotation of the beam and the axis of rotation of the cylindrical dispenser coincide. The beam positions the boss to articulate into the recess by flexing the distal end.

Additionally, in the preferred embodiment, the cylindrical dispenser comprises a hermetically-sealed refill unit having moisture vapor barrier properties. The refill unit is comprised of a closed end at one end of the cylindrical dispenser and an open end at the other end. Further, the refill unit comprises a means for hermetically sealing the open end. In another particularly preferred embodiment, the means for hermetically sealing comprises a bonded foil membrane. In an alternate version, the means for hermetically sealing comprises a treaded cap.

In an alternate embodiment, a method of dispensing moisturized sheets comprises the steps of providing a toilet roll dispenser as described above; providing a refill unit as described above; removing the toilet roll dispenser from a used roll of toilet paper; removing the end caps from the toilet roll dispenser; discarding the used cylindrical dispenser; removing the means for hermetically sealing to expose the open end of the refill unit; placing the end caps on both ends of the refill unit to reconfigure the toilet roll dispenser; placing the reconfigured toilet roll dispenser in the core of another, or the same, roll of toilet paper; and dispensing the moisturized sheets from the open end through an aperture in the end cap As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings, in which like reference characters designate the same or similar parts throughout the several views, and wherein.

DETAILED DESCRIPTION OF THE PREFERRED EMBODIMENT

Figure 1:
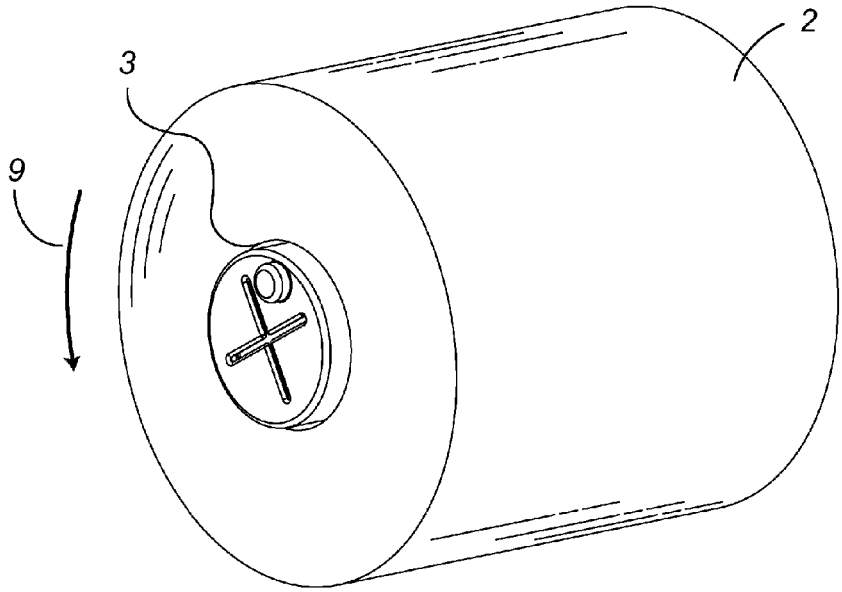
FIG. 1 is a perspective view of a first embodiment of the toilet roll dispenser with a roll of toilet paper positioned thereon.
Figure 2:
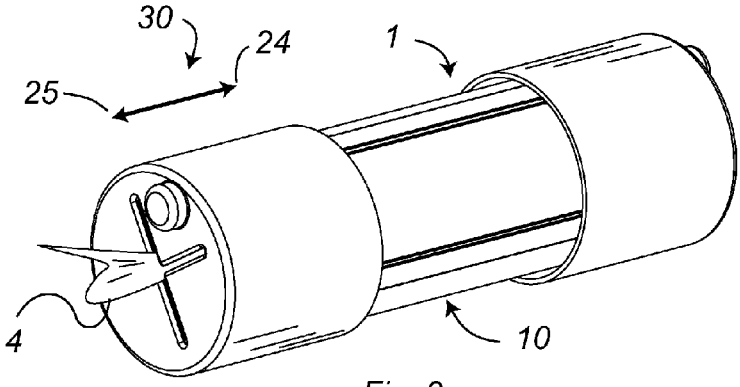
FIG. 2 is a perspective view of the first embodiment.
Figure 17:
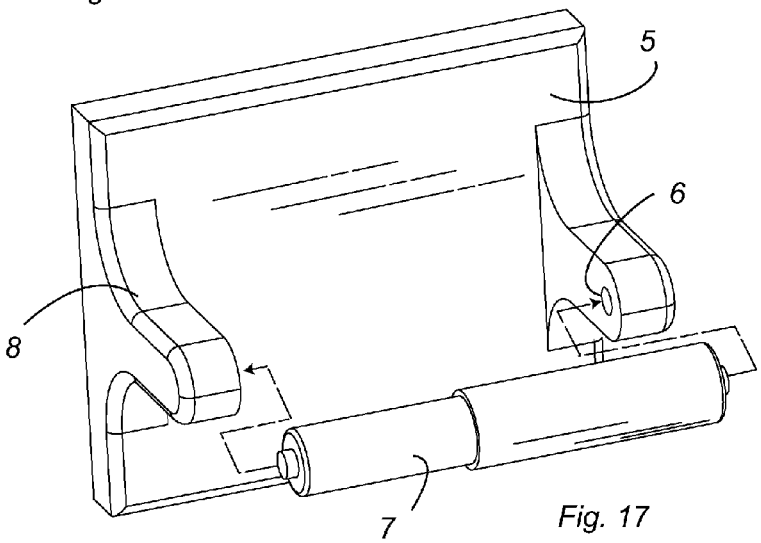
FIG. 17 is a perspective view of toilet roll wall bracket and spool.

As shown in FIGS. 1, 2 and 17, a toilet roll 2, wound around a core 3, is conventionally suspended in a wall bracket 5 by a spool 7 placed through the core and into recesses 6 of a pair of bracket arms 8. The toilet roll 2, thusly mounted in the wall bracket 5, can dispense sheets of toilet paper by unwinding from around the spool 7. In the present invention, the spool 7 is replaced by a toilet roll dispenser 1. The toilet roll dispenser 1 provides the additional capability of dispensing a plurality of moisturized sheets 4. The moisturized sheets 4 are conveniently located together with the dry sheets while both are close at hand for toilet use.

Figure 15:
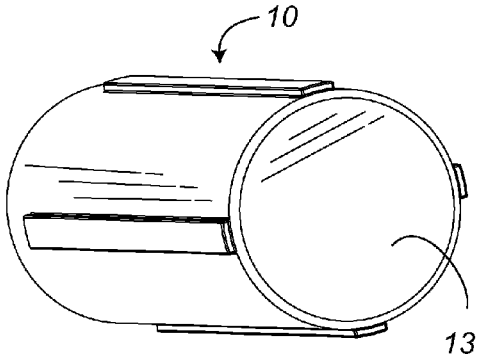
FIG. 15 is a perspective view of the cylindrical dispenser showing the sealed end.

Referring to FIGS. 2-5, the toilet roll dispenser 1 is comprised of a cylindrical dispenser 10 and a means for connecting 20 the cylindrical dispenser 10 to the wall bracket 5. The cylindrical dispenser 10 provides a housing for the moisturized sheets 4, which are contained there within. The cylindrical dispenser 10 protects the moisturized sheets 4 from the evaporation of the moisture. The cylindrical dispenser 10 is formed as a unitary container with a closed end 13 (FIG. 15). The other end, an open end 12, provides access for the moisturized sheets 4 and is the only aperture to the container requiring some form of sealing to complete the protective envelope. The container is comprised of a moisture-vapor barrier material. The cylindrical dispenser 10 has a rotational axis 11 about which the toilet roll 2 unwinds.

The means for connecting 20 is comprised of end caps 21 placed over each end of the cylindrical dispenser 10. Each end cap 21 has a boss 22 configured to fit within the recess 6 of the bracket arm 8. The bosses 22 lie along an axis parallel to, and offset from, the rotational axis 11. The offset is essentially the same as that of the axis of core 3 to the axis of spool 7 when the toilet roll 2 is conventionally mounted. The reader is reminded that the diameter of the spool 7 is significantly less, typically, than the diameter of the core 3; consequently, the axis of the hanging roll is offset from that of the spool.

The end caps 21 are further comprised of a means for articulating 30 the bosses 22 to removably, and securely, mount the cylindrical dispenser 10 between the bracket arms 8 of the wall bracket 5. In a first embodiment, the means for articulating 30 comprise a coil spring 31 positioned between at least one of the end caps 21 and the cylindrical dispenser 10. The end cap telescopes over the cylindrical dispenser from a bypass position 24 to seated position 25 (FIG. 2). The coil spring 31 biases the end cap 21 to its seated position 25 by compression based against spring stop 14.

Figure 16:
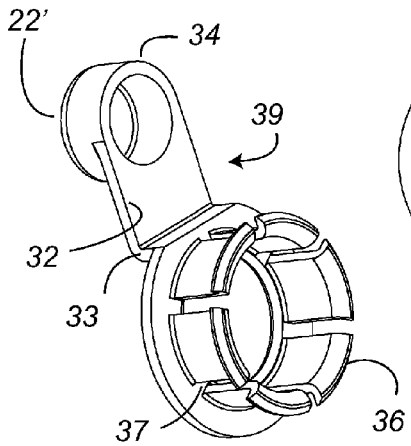
FIG. 16 is a perspective view showing details of the spinner component of the second embodiment.

A second embodiment of the means for articulating 30 is shown in FIGS. 8-12 and 16, wherein primed reference characters (') indicate features essentially equivalent to the first embodiment. The second means for articulating 30 is comprised of end caps 21' placed over each end of the cylindrical dispenser 10'. Each end cap 21' is provided with an annular aperture 38. A spinner 39 is rotatably fitted to each annular aperture 38. The spinner 39 is secured to end cap 21' by means of a ring of ledges 36 (FIG. 16). The ring of ledges 36 can be resiliently compressed by means of slots 37 to narrow the ring diameter so as to pass through the annular aperture 38. The ring of ledges 36, once passed, snaps the ledges into place where an interference of structures locks the assembly together. The compression results from forcing the ring of ledges 36 into the space of the annular aperture 38.

The spinner 39 is further comprised of a flexible beam 32. Flexible beam 32 flexes from its base at a proximal end 33. A boss 22', configured to fit within the recess 6 of the bracket arm 8, is positioned at a distal end 34. The bosses 22' lay along an axis parallel to, and offset from, a rotational axis 11'. As in the case of the first embodiment, the offset is essentially the same as that of the axis of core 3 to the axis of spool 7 in a conventional mount. In the second embodiment, the flexible beam 32 arcuately articulates (FIG. 9) to move the boss 22' from a bypass position 24' to a seated position 25'. The end caps 21' are rigidly held in position relative to the cylindrical dispenser 10' by end cap stops 15. The stops function to form a firm base for each flexible beam 32. The flexible beam 32 may provide a pre-load at the seated position 25' to assure the interposition of boss 22' in recess 6 and, thereby, the secure mounting of cylindrical dispenser 10' to the wall bracket 5.

The spinner 39 is further comprised of a spinner axis 35 located at or near the proximal end 33. Spinner axis 35 is coincident with the rotational axis 11'. In the second embodiment, the diameter of the cylindrical dispenser 10' is such that there is a snug fit to the diameter of core 3. When toilet roll 2 unwinds, it spins the toilet roll dispenser 1 about the spinner axis 35. In the case of the first embodiment, the diameter of the cylindrical dispenser 10 is such that there is a loose fit to the diameter of core 3. When the toilet roll 2 unwinds in this case, the core 3 slips over the toilet roll dispenser 1 and does not spin it. In both the first and second embodiments, the unwind direction 9 of toilet roll 2 (FIGS. 1 and 8) is counter-clockwise, such that the sheets unspool from the bottom. In this way, the unwind pull lifts the toilet roll dispenser 1 away from the wall and frees the rotation. Otherwise, with the unwind direction clockwise, the roll becomes pinned against the wall by rotation about the boss axis.

Figure 3:
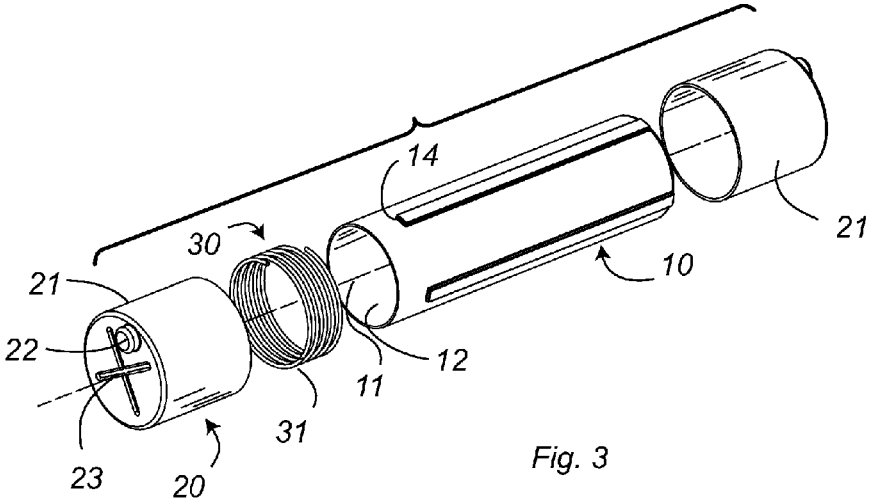
FIG. 3 is an exploded perspective view of the first embodiment.
Figure 5:
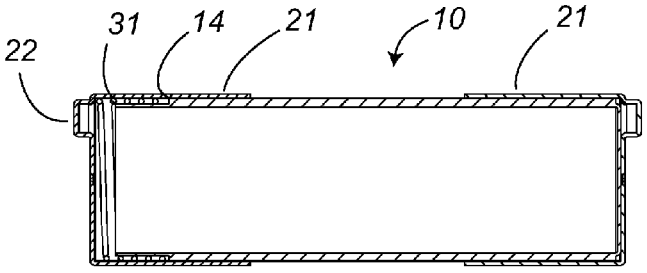
FIG. 5 is a sectional view taken along the lines 5-5 of FIG. 4.
Figure 4:
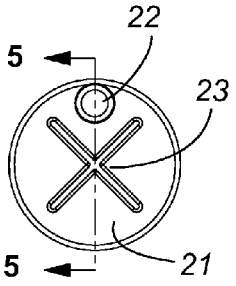
FIG. 4 is an end elevation view of the first embodiment.

At least one of the end caps 21 further comprises a dispensing aperture 23, as shown in FIG. 3. The dispensing aperture 23 is preferably centered on the rotational axis 11, and communicates with the interior of the cylindrical dispenser 10 to enable moisturized sheets 4 to be withdrawn there from. The moisturized sheets 4 are interleaved or, otherwise, connected with perforations, so that they can be singulated when withdrawn from the dispensing aperture 23 and replaced therein with the next succeeding sheet. The moisturized sheets 4 can be wound in a roll without a core to dispense from the center of the roll. Alternatively, the moisturized sheets can take the conformation of a coiled rope-twist. The dispensing aperture 23 is sized and configured to minimize exposure to evaporative losses. A preferred configuration of dispensing aperture 23 is crossed slits, wherein the triangular-shaped vanes at the intersection of the slits are feathered to yield easily when withdrawing a sheet. An alternate version is shown by dispensing aperture 23' in FIG. 10. In this version, the moisturized sheets pass through the annular aperture 38, the opening of which is narrowly restricted to the minimized breadth of a singular sheet.

Figure 6:
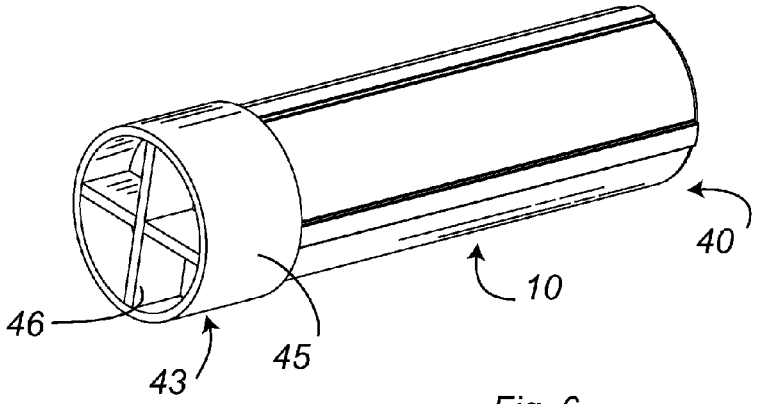
FIG. 6 is a perspective view of the refill assembly of the first embodiment.
Figure 7:
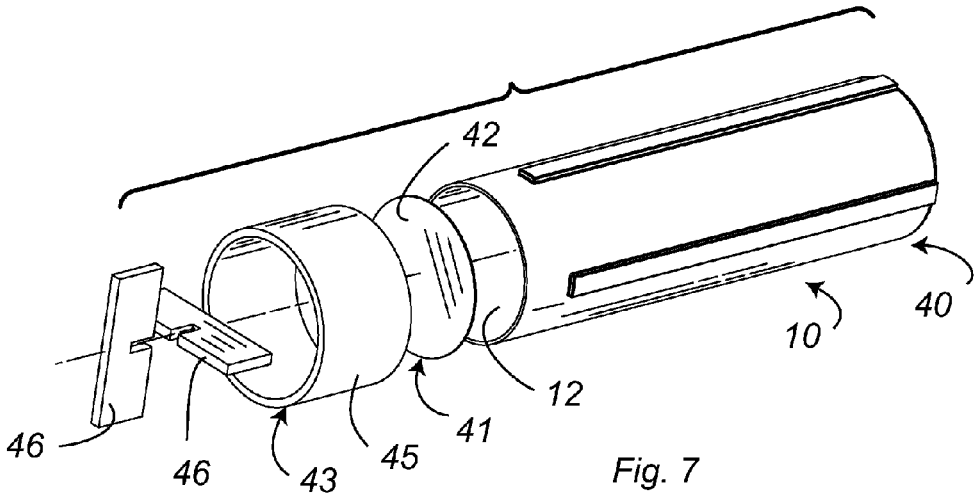
FIG. 7 is an exploded perspective view of the refill assembly of the first embodiment.
Figure 8:
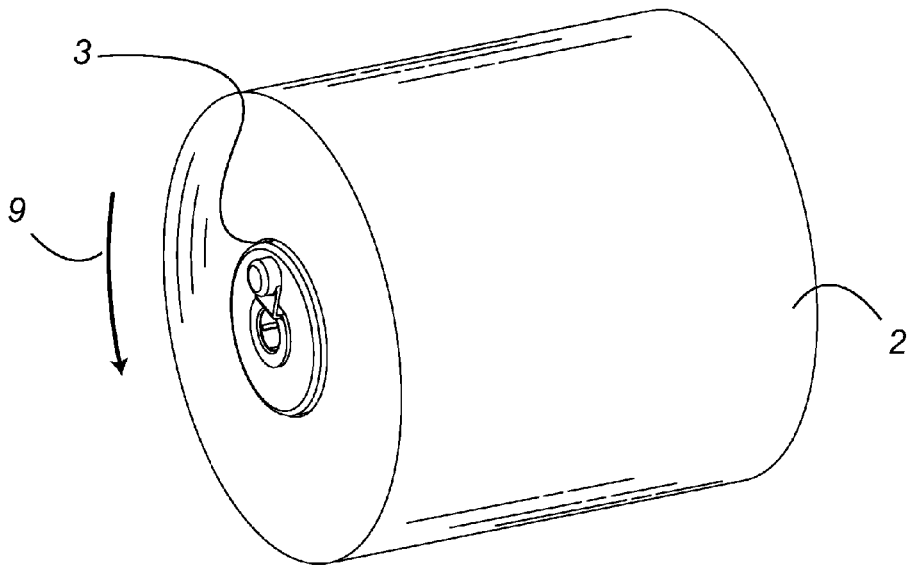
FIG. 8 is a perspective view of a second embodiment of the toilet roll dispenser with a roll of toilet paper positioned thereon.
Figure 9:
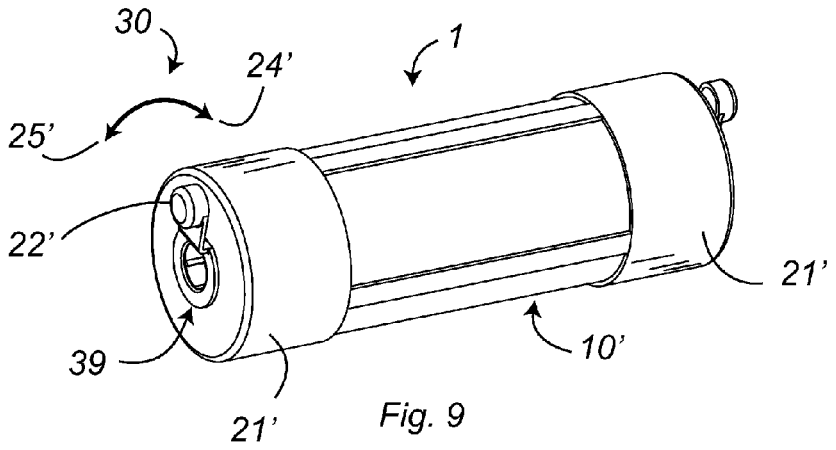
FIG. 9 is a perspective view of the second embodiment.
Figure 10:
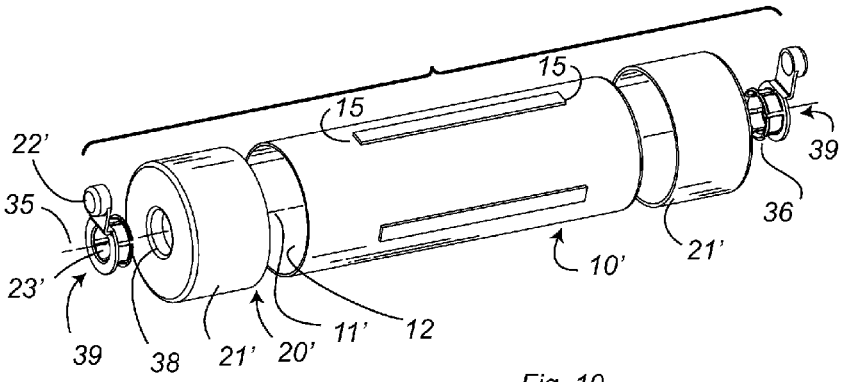
FIG. 10 is an exploded view of the second embodiment.
Figure 12:
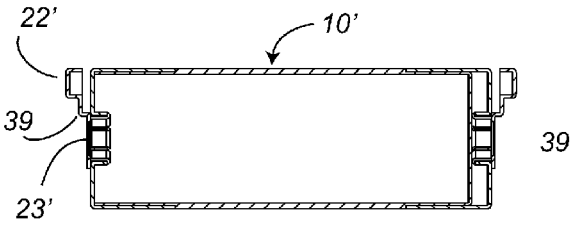
FIG. 12 is a sectional view taken along the lines 12-12 of FIG. 11.
Figure 11:
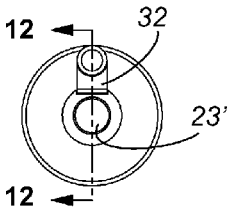
FIG. 11 is an end elevation view of the second embodiment.
Figure 13:
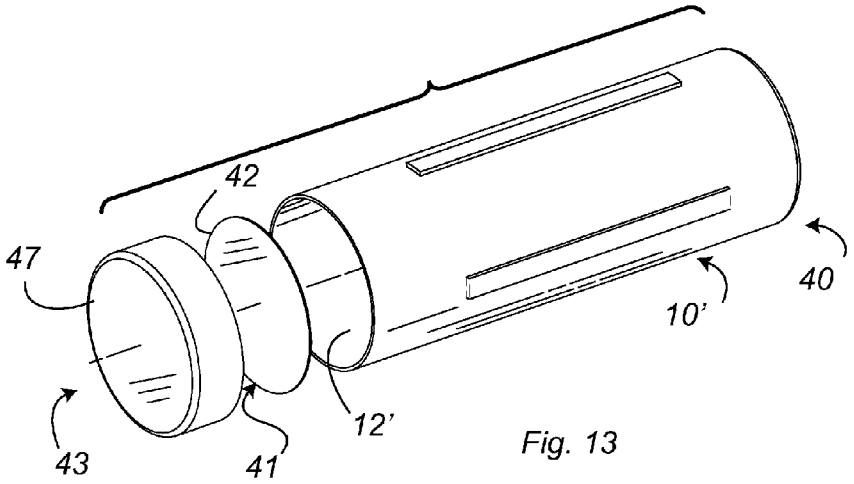
FIG. 13 is an exploded view of the refill assembly of the second embodiment, showing an alternative disposable cap.
Figure 14:
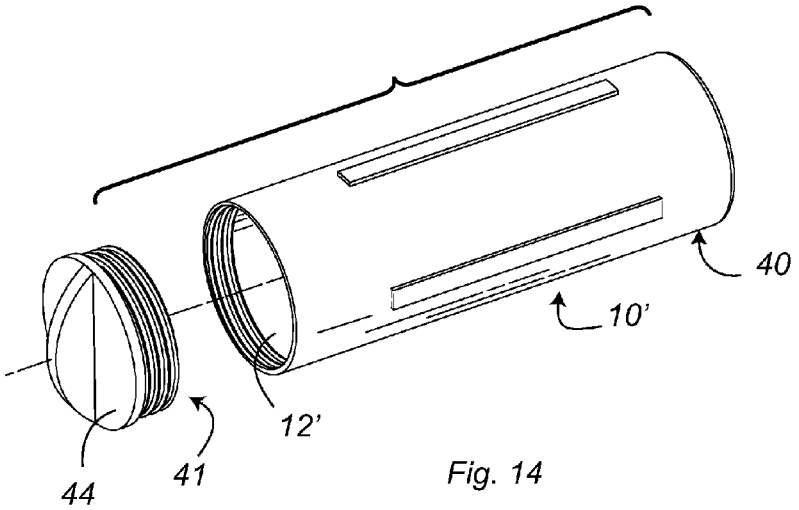
FIG. 14 is an exploded view of the refill assembly of the second embodiment, showing an alternative hermetic seal.

Referring to FIGS. 6, 7,13 and 14, a refill unit 40 is shown. The refill unit 40 is comprised of the cylindrical dispenser 10 (10') and a means for hermetically sealing 41. In the preferred embodiment, the means for hermetically sealing 41 is a foil membrane 42, which is bonded to the open end 12 (12'). The foil membrane 42 may be frangible, or otherwise strippable, to facilitate its removal from the open end. Alternatively, the means for hermetically sealing 41 can be a threaded cap 44 (FIG. 14). When the foil membrane 41 is used, a disposable cap 43 is required to protect the frangible membrane from inadvertent puncture. Preferably, the disposable cap 43 is comprised of low cost and environmentally-friendly materials. One such example is a spiral-wound paper core 45, (FIGS. 6 and 7). The open end of the spiral-wound paper core 45 can be plugged with interlocked paperboard partitions 46, as shown. Alternatively, the disposable cap 43 is a friction-fit cap 47, which can be slipped over the end of the cylindrical dispenser 10 (10') to cover the foil membrane 41 (FIG. 13).

In the preferred embodiment, the cylindrical dispenser 10 (10'), the end caps 21 (21'), the spinner 39, the threaded cap 44 and the friction-fit cap 47 are all injection molded. The thermoplastic resins of choice will have the properties of toughness and stiffness. The molded parts may be translucent, transparent or opaque. The wall thickness should be sufficient to prevent critical moisture loss over the period of the preferred shelf life. The preferred resins are commodity-grade polyethylene, polypropylene, high-impact polystyrene, or polyolefin. The foil membrane 42 can be bonded to the open end by induction sealing or gluing. The spiral-wound paper core 45 is fabricated by lapping strips of paper in a glued winding over a mandrel, as known in the art, and then cut to length.

In an alternative embodiment, a method of dispensing moisturized sheets, coincident with a toilet paper roll, comprises the following steps:

i. Providing the toilet roll dispenser 1 after having used up the moisturized sheets 4 therein;
ii. providing the refill unit 40;
iii. removing the toilet roll dispenser 1 from the core 3 of the existing toilet roll 2;
iv. removing the end caps 21' from the cylindrical dispenser 10';
v. discarding the used cylindrical dispenser 10';
vi. removing the means for hermetically sealing 41 to expose the open end 12' of the refill unit 40;
vii. placing the end caps 21' onto both ends of the refill unit 40 to reconfigure the toilet roll dispenser 1;
viii. pulling a corner of the first sheet of the moisturized sheets 4 through the dispensing aperture 23' to provide a starter-edge;
ix. placing the reconfigured toilet roll dispenser 1 into the core 3 of another, or the same, toilet roll 2; and
x. dispensing the moisturized sheets 4 from the dispensing aperture 23'.

In another alternative embodiment, a method of dispensing moisturized sheets, coincident with a toilet paper roll, comprises the following steps:

i. Providing the toilet roll dispenser 1 after having used up the moisturized sheets 4 therein;
ii. providing the refill unit 40;
iii. removing the toilet roll dispenser 1 from the core 3 of the existing toilet roll 2;
iv. removing the end caps 21 from the cylindrical dispenser 10;
v. removing the coil spring 31 from the cylindrical dispenser 10;
vi. discarding the used cylindrical dispenser 10;
vii. removing the means for hermetically sealing 41 to expose the open end 12 of the refill unit 40;
viii. placing the coil spring 31 over the open end 12 of the refill unit 40;
ix. placing the end caps 21 onto both ends of the refill unit 40 and over the coil spring 31 to reconfigure the toilet roll dispenser 1;
x. pulling a corner of the first sheet of the moisturized sheets 4 through the dispensing aperture 23 to provide a starter-edge;
xi. placing the reconfigured toilet roll dispenser 1 into the core 3 of another, or the same, toilet roll 2; and
xii. dispensing the moisturized sheets 4 from the dispensing aperture 23.

It is to be understood that the invention is not limited in its application to the details of construction and to the arrangements of the components set forth in the preceding description or illustrated in the drawings. For example, the cylindrical dispenser 10 may be a tube having a closed end 13 comprised of a bonded foil membrane 42. Further, the toilet roll dispenser 1 may be made up from end cap 22 on one end of the cylindrical dispenser 10 and end cap 22' on the other end. Also, it is to be understood that the phraseology and terminology employed herein are for the purpose of the description and should not be regarded as limiting.

What is claimed is:

1. A toilet roll dispenser for moisturized sheets *for use with a wall bracket having two arms with recesses to receive a conventional toilet roll spool*, comprising:

a cylindrical dispenser, having a rotational axis, configured to fit within the core of a toilet roll;

a plurality of moisturized sheets contained within the cylindrical dispenser, said moisturized sheets connected to dispense sequentially from, at least, one end of the core; [and]

[a wall bracket having two arms with recesses to receive a conventional toilet roll spool; and]

end caps placed at each end of the cylindrical dispenser to cover each end and surround the portions of the cylindrical dispenser located proximal to each end, each end cap [is] provided with an annular aperture; *and* spinners, enabling rotation of the cylindrical dispenser, fixedly *and rotatably* fitted to each respective end cap through the annular apertures provided therein; wherein [the spinners comprise] *each spinner comprises*: [bosses] *a boss* configured to fit the recesses, the [bosses] *boss* lying along an axis parallel to and offset from the rotational axis; a flexible beam[, each] *with the* boss positioned at a distal end [of the flexible beam] *thereof*; a dispensing aperture provided in a proximal end of the flexible beam, the center of the dispensing aperture providing a spinner axis; wherein the [axis of] the spinner *axis* and the rotational axis of the cylindrical dispenser coincide[;] the beam [positioning] *positions* the respective boss to articulate into the respective recess by *means of* flexing the distal end;

whereas, a roll of toilet paper rotatably mounted on the cylindrical dispenser and suspended from the wall bracket by the bosses unwinds conventionally about the rotational axis, while the moisturized sheets dispense through the dispensing aperture from the interior of the core.

2. The toilet roll dispenser of the claim 1, wherein the cylindrical dispenser is supplied as a hermetically-sealed refill unit having moisture vapor barrier protection.

3. The toilet roll dispenser of claim 1, wherein the dispensing aperture is sized and configured to minimize evaporative losses from the interior.

4. The toilet roll dispenser of claim 2, wherein the refill unit is comprised of a closed end at one end of the cylindrical dispenser, an open end at the other end of the cylindrical dispenser, and a means for hermetically sealing the open end.

5. The toilet roll dispenser of claim 4, wherein the means for hermetically sealing comprises a bonded foil membrane.

6. The toilet roll dispenser of claim 5, wherein the means for hermetically sealing further comprises a disposable cap to protect the foil membrane from being punctured.

7. The toilet roll dispenser of claim 4, wherein the means for hermetically sealing comprises a threaded cap.

8. The toilet roll dispenser of claim 1, wherein the fit of the core of the toilet roll to the cylindrical dispenser is sufficiently tight such that the toilet roll spins the cylindrical dispenser about the axis of the spinners.

9. A method of dispensing moisturized sheets, comprising the steps of:

providing the toilet roll dispenser of claim 1 after the exhaustion of the moisturized sheets therein;

providing the refill unit of claim 5;

removing the toilet roll dispenser from the used roll of toilet paper;

[removing the end caps from the toilet roll dispenser;]

discarding the used cylindrical dispenser;

removing the bonded foil membrane to expose the open end of the refill unit;

[placing the end caps onto the refill unit to reconfigure the toilet roll dispenser;]

placing the reconfigured toilet roll dispenser in the core of another, or the same, roll of toilet paper; and dispensing the moisturized sheets from the open end through an aperture in the end cap.

* * * * *